United States Patent
Salour et al.

(10) Patent No.: US 10,162,338 B2
(45) Date of Patent: Dec. 25, 2018

(54) SYSTEMS FOR INTELLIGENT BATCH PROCESSING

(71) Applicant: The Boeing Company, Chicago, IL (US)

(72) Inventors: Ali Salour, Fenton, MO (US); Douglas Duane Trimble, St. Peters, MO (US); Anna Yvette Kalinowski, St. Charles, MO (US); Jolynnetta Aisha Neal, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 300 days.

(21) Appl. No.: 15/043,391

(22) Filed: Feb. 12, 2016

(65) Prior Publication Data
US 2017/0235297 A1 Aug. 17, 2017

(51) Int. Cl.
*G05B 19/4093* (2006.01)
*G05B 15/02* (2006.01)

(52) U.S. Cl.
CPC ....... *G05B 19/40937* (2013.01); *G05B 15/02* (2013.01); *G05B 2219/32211* (2013.01)

(58) Field of Classification Search
CPC .............................................. G05B 19/40937
See application file for complete search history.

(56) References Cited

U.S. PATENT DOCUMENTS

| | | | | |
|---|---|---|---|---|
| 7,487,003 B1* | 2/2009 | Glavach | ................ | G06Q 10/06 700/108 |
| 8,935,286 B1* | 1/2015 | Westerman, Jr. | .... | G06Q 10/087 705/28 |
| 2007/0114280 A1* | 5/2007 | Coop | .................... | G06Q 10/08 235/385 |
| 2007/0205280 A1* | 9/2007 | Bowe, Jr. | ............... | G06Q 10/00 235/385 |

(Continued)

OTHER PUBLICATIONS

El Ghazali et al., The Potential of RFID as an Enabler of Knowledge Management and Collaboration for the Procurement Cycle in the Construction Industry, Journal of Technology Management & Innovation vol. 7 No. 4, 2012, 26 pages.

(Continued)

*Primary Examiner* — Moazzam Hossain
(74) *Attorney, Agent, or Firm* — Kolisch Hartwell, P.C.

(57) ABSTRACT

Manufacturing systems that employ intelligent sensing and methods for processing workpieces using such manufacturing systems, including methods of batch processing workpieces. The manufacturing systems may include a holding device to receive work order documents, where each work order document includes an identification tag, and each work order document corresponds with a specific manufacturing step. A scanner may be proximate to the holding device and associated with a workstation, where the scanner is configured to detect the identification tag of the work order documents held by the holding device. A control system may interpret the detected identification tag, identify the work order document associated with the interpreted (Continued)

identification tag, identify the specific manufacturing step corresponding with the identified work order document, and generate an output that includes an instruction for carrying out the manufacturing step at the workstation.

20 Claims, 5 Drawing Sheets

(56) References Cited

U.S. PATENT DOCUMENTS

| | | | | |
|---|---|---|---|---|
| 2008/0208380 | A1* | 8/2008 | Taylor | G05B 19/0426 700/108 |
| 2009/0307527 | A1* | 12/2009 | Robbins | G06Q 10/087 714/15 |
| 2011/0046999 | A1* | 2/2011 | Nielsen | G06Q 10/063 705/7.39 |
| 2012/0075079 | A1* | 3/2012 | Takagi | G05B 19/12 340/10.51 |
| 2014/0132720 | A1* | 5/2014 | Rogers | B21D 5/004 348/46 |
| 2015/0356520 | A1* | 12/2015 | Mitti | G06Q 10/087 705/305 |
| 2016/0274553 | A1* | 9/2016 | Strohmenger | G05B 19/41885 |

OTHER PUBLICATIONS

Association for Automatic Identification and Mobile Data Capture, RFiD or "Smart Labels", URL: http://www.alliancegroup.co.uk/rfid.htm, circa before Nov. 20, 2015, 4 pages.

* cited by examiner

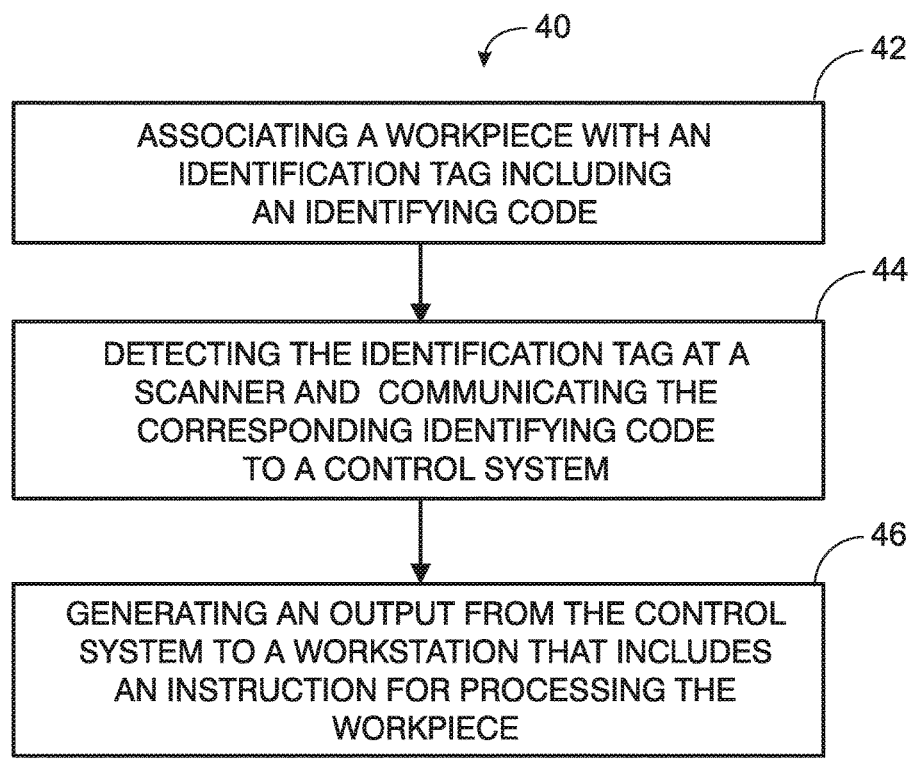

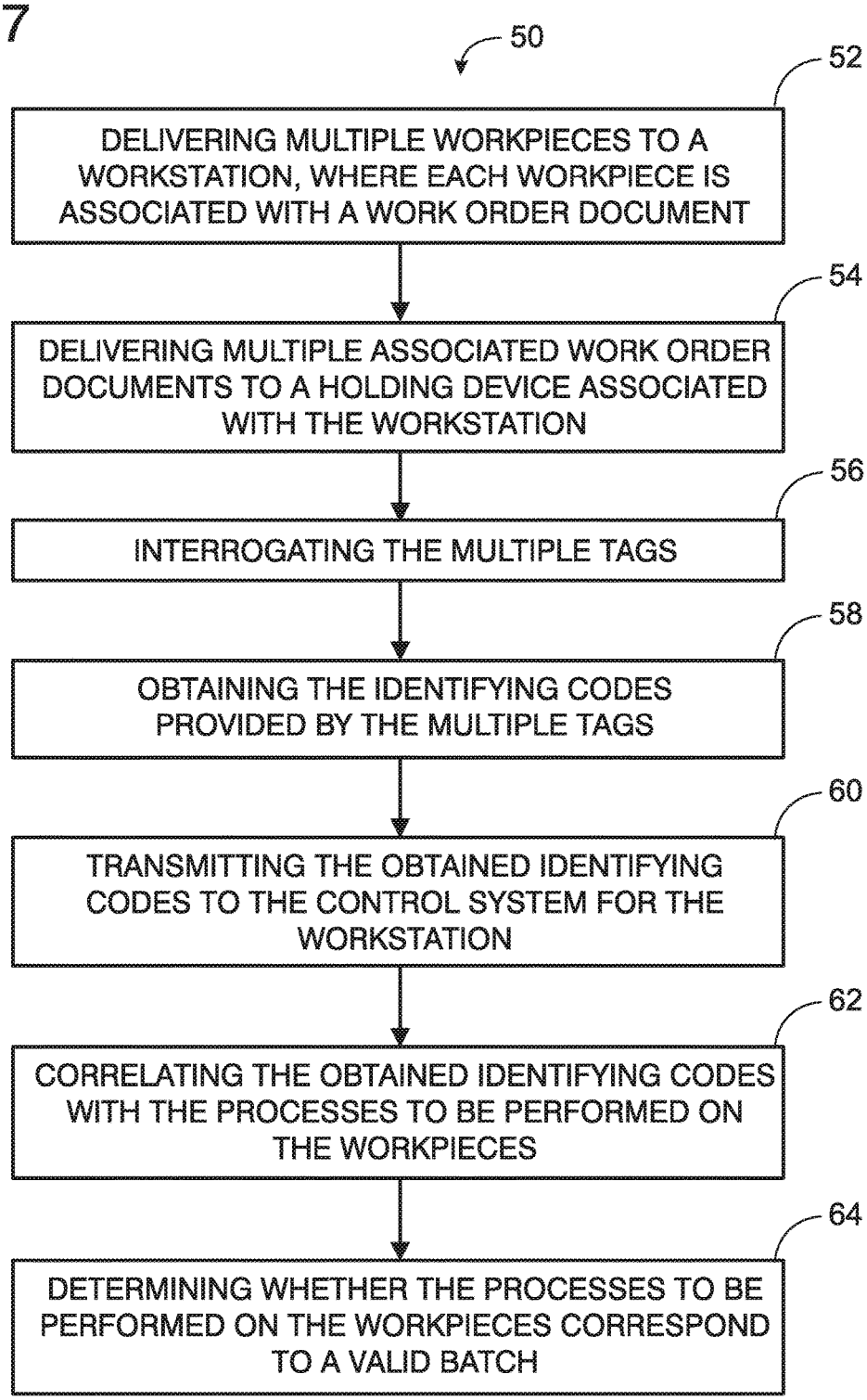

SYSTEMS FOR INTELLIGENT BATCH PROCESSING

FIELD

This disclosure relates to systems for managing workflow for manufacturing processes, and more specifically to managing batch processing operations.

BACKGROUND

The advent of industrial automation and computerization has resulted in increased manufacturing efficiency and productivity, but also created new problems in tracking production and workflow. The high throughput and complexity of modern manufacturing methods may require electronic record-keeping and tracking systems in order to properly manage production.

Unfortunately, such strategies may in turn require frequent verification of the associated electronic records during manufacture, which may require manual data entry of potentially long and complex identification codes or numbers. The prevalence of such systems may consume man-hours of labor while at the same time remaining vulnerable to simple human error, leading to additional man-hours of labor correcting such errors.

SUMMARY

The present disclosure provides manufacturing systems, methods of processing a workpiece, and methods of batch processing workpieces that employ intelligent sensing.

In some aspects, the disclosure may provide manufacturing systems that include a holding device configured to receive one or more work order documents, where each work order document includes an identification tag associated with that work order document, and each work order document corresponds with a specific manufacturing step. The manufacturing system my further include a scanner that is proximate to the holding device and associated with a workstation, where the scanner is configured to detect the identification tag of the work order documents held by the holding device. The manufacturing systems may further include a control system configured to interpret the detected identification tag, identify the work order document associated with the interpreted identification tag, identify the specific manufacturing step corresponding with the identified work order document, and generate an output that includes an instruction for carrying out the specific manufacturing step at the workstation.

In some aspects, the disclosure may provide methods of processing a workpiece, the methods including associating a workpiece with an identification tag that includes an identifying code; detecting the identification tag at a scanner, and communicating the corresponding identifying code to a control system; and generating an output from the control system to a workstation that includes an instruction for processing the workpiece.

In some aspects, the disclosure may provide methods of batch processing workpieces in a composite manufacturing process, the methods including delivering a plurality of workpieces to a workstation, where each workpiece is associated with a work order document; delivering the associated work order documents to a holding device that is associated with the workstation, where each work order document includes a tag that is configured to respond to interrogation by providing an identifying code correlated with a process to be performed on the associated workpiece at the workstation, the correlation being stored in a database that is accessible to a control system for the workstation. The method may further include interrogating the tags; obtaining the identifying codes provided by the tags; transmitting the obtained identifying codes to the control system for the workstation; correlating, by the control system, the obtained identifying codes with the processes to be performed on the workpieces; and determining, by the control system, whether the processes to be performed on the workpieces corresponds to a valid batch.

The features, functions, and advantages may be achieved independently in various aspects of the present disclosure, or may be combined in yet other aspects further details of which can be seen with reference to the following description and drawings.

BRIEF DESCRIPTION OF THE DRAWINGS

FIG. 6 is a flowchart illustrating a method of processing a workpiece at a workstation, according to an aspect of the present disclosure.

FIG. 7 is a flowchart illustrating a method of batch processing workpieces in a composite manufacturing process, according to an aspect of the present disclosure.

DESCRIPTION

Figure 1:
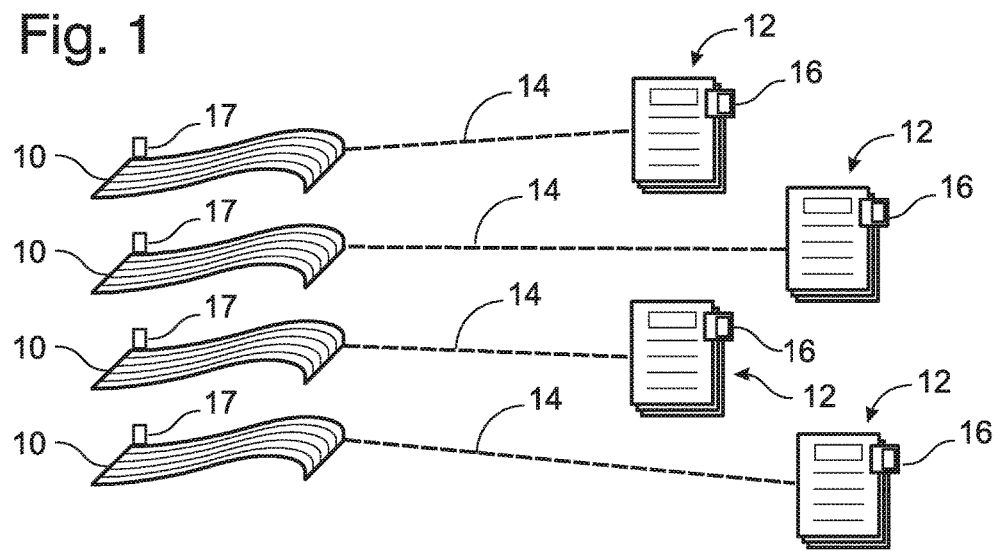
FIG. 1 is a schematic depiction of a plurality of workpieces, each associated with a work order document having an identifying tag, according to an aspect of the present disclosure.

The systems and methods of the present disclosure may help provide enhanced efficiency in manufacturing processes by employing intelligent analytics for verifying part location and work sequence steps while eliminating the need for manual data entry.

The systems of the present disclosure may be configured to automatically identify workstation location, enumerate and evaluate work orders delivered to a workstation, and identify and/or confirm a proper control program for tooling that may be incorporated or associated with the workstation, and that may be employed to carry out the process or processes specified by the work orders. In this way, the systems and methods of the present disclosure may help provide work order accountability and reduce such errors as the incorrect selection of materials or tools for the specified jobs.

Various embodiments of manufacturing systems and manufacturing methods and processes having one or more such advantageous properties are described below and illustrated in the associated drawings. Unless otherwise specified, the disclosed systems and methods may, but are not required to, contain at least one of the structure, components, functionality, and/or variations described, illustrated, and/or incorporated herein. Furthermore, the structures, components, functionalities, and/or variations described, illustrated, and/or incorporated herein in connection with the present teachings may, but are not required to, be combined with and/or incorporated into other similar or related manufacturing processes. Furthermore, although disclosed as useful in the context of aircraft manufacture, the systems and methods disclosed herein may have utility in any suitable application and appropriate environment, without limitation. The following description of various examples is merely exemplary in nature and is in no way intended to limit the disclosure, its application, or uses. Additionally, the advantages provided by the examples, as described below, are illustrative in nature and not all examples may provide the same advantages or the same degree of advantages.

Definitions

Workpiece

A piece of material that is intended to be, or is in the process of being, cut, shaped, or otherwise machined as part of a manufacturing process.

Tooling

Tooling refers to machinery used for shaping or machining a workpiece, for example by cutting, boring, grinding, shearing, pressing, or other forms of deformation.

In many modern manufacturing facilities, an individual workpiece may be routed to one or more workstations during processing. The path or destination of such a workpiece may be recorded on a work order, or similar physical documentation. Unfortunately, a given work order may become separated from its corresponding workpiece, or a workpiece can be misrouted and subjected to an inappropriate procedure. By implementing a system of intelligent sensing, the manufacturing process may become more efficient and reliable, ensuring that only the correct materials, tools, and machine programs are used in a given manufacturing process.

Multiple individual workpieces 10 are shown in FIG. 1. The workpieces depicted in FIG. 1 are intended to be representative and are not intended to correspond to any particular material, intermediate, or product component. Each workpiece 10 may be associated with a particular work order document 12, where the association between a workpiece 10 and a work order document 12 is represented in FIG. 1 by a dashed line 14. Each work order document 12 may correspond with one or more specific manufacturing steps to be carried out on the workpiece 10 associated with that work order document 12. For example, the association between a workpiece 10 and its corresponding work order document 12 may include an identification of that workpiece, an identification of one or more manufacturing steps to be carried out on that workpiece, and an identification of the specific workstations where the manufacturing steps should be carried out on that workpiece, among other data.

Although the work order documents 12 of FIG. 1 are schematically depicted as sheets of paper and are referred to as documents, they are not necessarily required to include one or more sheets of paper. Any medium capable of recording or encoding the data corresponding to a particular work order may be an appropriate medium for the purposes of this disclosure. For example, the work order document 12 may include an electronic document or file containing the required information. Where present, the electronic document may be present in a computer-readable medium (or media) having computer-readable code or data recorded thereon, such as for example flash drives, floppy discs, optical discs, and the like.

Each work order document 12 may additionally include an identification tag 16 that may be attached to or otherwise associated with the work order document 12. The identification tag 16 is configured so that upon appropriate interrogation the identification tag 16 responds by providing an identifying code that may be correlated with the one or more specific manufacturing steps to be carried out on the workpiece 10 that is associated with that work order document 12.

Alternatively, or in addition, an identification tag 17 may be attached to or otherwise associated with each workpiece 10, as shown in FIG. 1. The identification tag 17 may also be configured so that upon appropriate interrogation the identification tag 17 responds by providing an identifying code, where the resulting identifying code may be correlated with an associated work order document 12, one or more specific manufacturing steps to be carried out on the workpiece 10 as defined by the work order document 12, and/or an appropriate workstation 20 for carrying out the one or more specific manufacturing steps. Whether or not explicitly stated, any aspects of identification tag 16 disclosed herein may be applied equivalently to identification tag 17.

Any technology capable of providing a useful identifying code upon interrogation is a useful technology for the purposes of this disclosure. For example, each identification tag 16 may incorporate a barcode, so that scanning of the barcode provides a corresponding identifying code.

Figure 2:
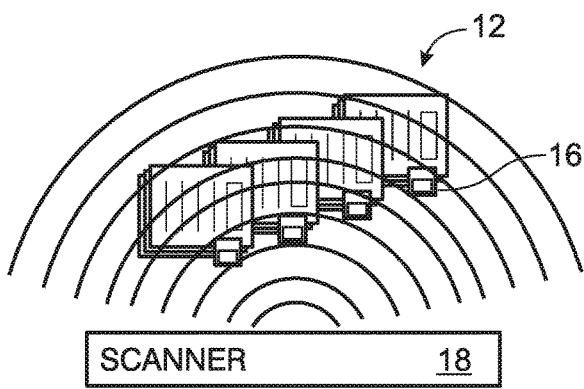
FIG. 2 is a schematic depiction of a scanner interrogating a plurality of identifying tags.
Figure 3:
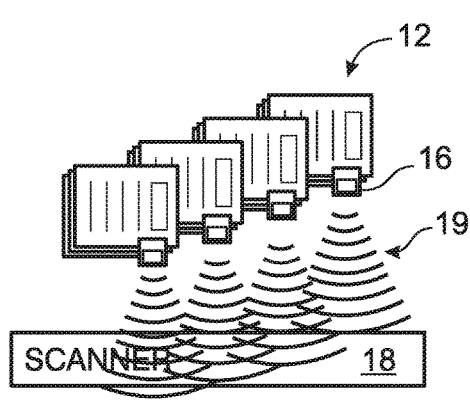
FIG. 3 is a schematic depiction of the plurality of identifying tags of FIG. 2 transmitting identifying codes to the scanner.

In one aspect of the disclosure, each identification tag 16 may include a radio-frequency identification (RFID) chip and its associated antenna, so that the RFID chip may be interrogated by an RFID scanner 18 as shown semi-schematically in FIG. 2. The interrogation of the identification tag 16 energizes each RFID chip that is proximate to the RFID scanner 18 via the antenna associated with that RFID chip. The energized RFID chip may then respond by transmitting a signal that includes its respective identifying code 19, as schematically represented in FIG. 3. By utilizing RFID technology, the holding device 28 and scanner 18 may be configured so that the scanner 18 can detect multiple identification tags 16 associated with multiple work order documents 12 simultaneously, although any other method permitting the simultaneous detection and interrogation of multiple identification tags 16 may also be useful.

Figure 4:
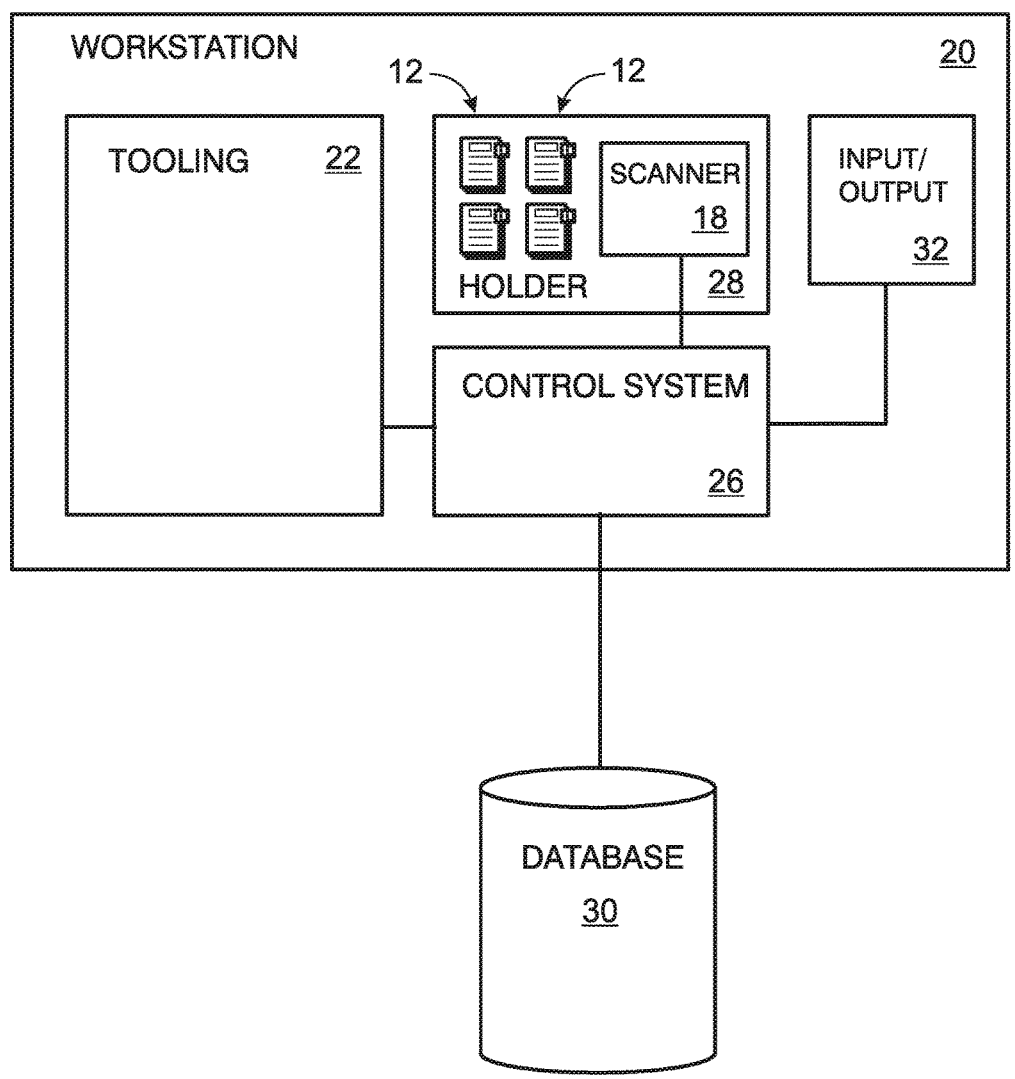
FIG. 4 is a schematic depiction of an illustrative workstation coupled to a database, according to an aspect of the present disclosure.

The work order document 12 and identification tag 16 as described herein may be used in conjunction with a manufacturing system that includes a workstation 20, as shown in FIG. 4. The workstation may include appropriate tooling 22 for performing the desired shaping or machining of a workpiece, a control system 24 configured to control the tooling 22, and an input/output interface 26 for a workstation operator, if an operator is necessary and present.

As discussed above, each work order document 12 may be associated with a workpiece 10, and may include an identification of one or more manufacturing steps to be carried out on that workpiece. As a given workpiece 10 is routed to an appropriate workstation 20 for conducting the one or more manufacturing steps, the workpiece 10 may be accompanied by, or be delivered in parallel with, its associated work order document 12.

Workstation 20 may include a holding device 28 that is configured to receive one or more work order documents 12 that each include an identification tag 16. Each work order document 12 may be placed in or on the holding device 28 of the workstation 20, where the holding device 28 may include any device, enclosure, or marked area in which multiple work order documents 12 may be placed so that their identification tags 16 are positioned appropriately for either automated or manual interrogation by a proximal scanner 18. In one aspect of the disclosure the holding device 28 includes an open tray, resembling an in-basket, and configured to receive and retain multiple work order documents 12 in proximity to a scanner 18. Alternatively or in addition, the holding device 28 may include a folder, in which multiple work order documents may be placed, or a binder clip or other retaining clip or clamp in which multiple work order documents 12 can be physically secured. In another aspect of the disclosure, the holding device 28 may correspond to a demarcated area on a flat surface such as a countertop or shelf upon which work order documents 12 may be stacked, where the demarcations are placed so that when the work order documents 12 are within the demarcations on the surface, the identification tags 16 associated with those work order documents 12 are positioned appropriately for successful interrogation by the scanner 18.

Scanner 18 may be electronically coupled to control system 24 of workstation 20, as shown in FIG. 4. In one aspect of the disclosure, the workstation 20 may be configured so that upon receiving an identifying code 19 the scanner 18 transmits the identifying code 19 to the control system 24. Control system 24 may then look up the identifying code 19 in a remote database 30. Database 30 may include a variety of relevant data that may be associated with the specific identifying code 19. For example, using the identifying code 19 the control system 24 may retrieve the identity of the work order document 12 that should be associated with the interpreted identification tag 16, the identity of the workpiece 10 that is associated with that particular work order document 12, and the specific manufacturing step or steps corresponding with that particular work order document 12, among other data.

Where one or more workpieces 10 include an identification tag 17, an alternative scanner may be incorporated into a rack or other holding apparatus associated with a workstation, where workpieces may be placed in preparation for processing. The alternative scanner may be used to interrogate the identification tag 17, so that the control system 20 may validate that a given workpiece 10 has been delivered to the appropriate workstation, or that the given workpiece 10 has been delivered with the appropriate work order document 12.

After retrieving data relevant to the identifying code 19, the control system 20 may then generate an output to an input/output interface 32 of the workstation 20. The output may include any or all of the data retrieved from the database 30. In particular, the output may include an explicit identification of the work order document 12, such as a work order serial number, so that an operator of the workstation 20 may quickly confirm that the identification tag 16 is accompanying the correct work order document 12. The output may additionally or alternatively include an explicit identification of the workpiece 10 associated with the work order document 12, such as by a part serial number or other identifying indicia on the workpiece 10 itself, so that an operator of the workstation 20 may quickly confirm that the correct workpiece 10 has accompanied the work order document 12 to the workstation 20. The output may additionally or alternatively including an identification of, or instruction for carrying out, the one or more specific manufacturing steps intended for the workpiece 10 using the tooling 22 of workstation 20, so that an operator of the workstation 20 may quickly confirm that the workpiece 10 and work order document 12 have been delivered to the correct workstation.

In one aspect of the disclosure, the control system 20 may independently and/or automatically evaluate the one or more specific manufacturing steps intended for the workpiece 10 as stored in the database 30, and upon determining that one or more of the specific manufacturing steps is inconsistent with manufacturing performed with the workstation 20 generate a notification or an alarm for the operator of the workstation 20. Alternatively or in addition, the control system 20 may be configured so that where the one or more specific manufacturing steps is inconsistent with the operation of workstation 20, the control system 30 may automatically halt the operation of workstation 20 in order to prevent an unwanted or unintended operation.

Figure 5:
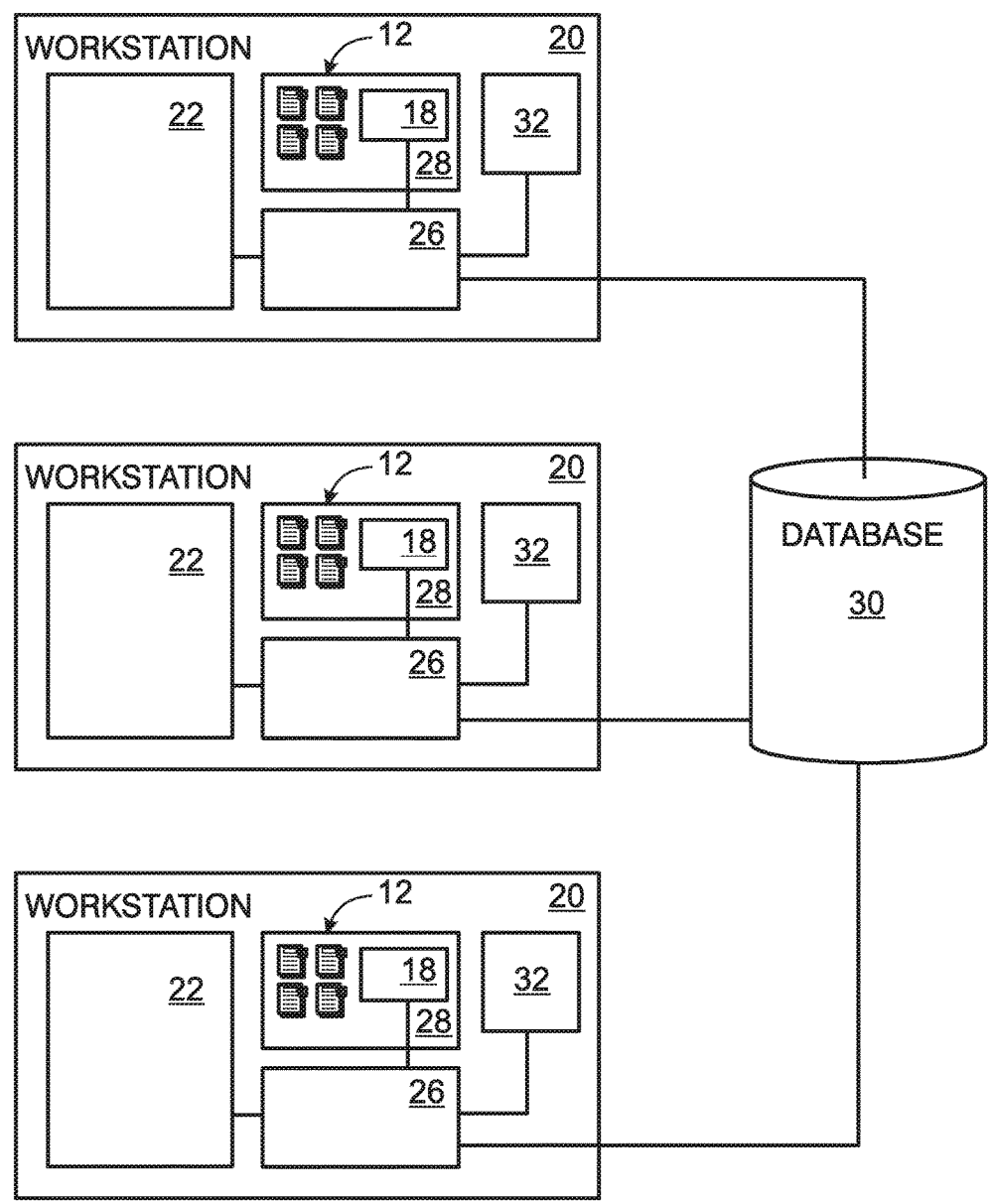
FIG. 5 is a schematic depiction of a network of illustrative workstations coupled to a database.

As shown in FIG. 5, the disclosed manufacturing systems may be well-suited for multiple networked intelligent workstations 20. In such a system, the central shared database 30 may serve as a repository for all information that may be associated with a given workpiece 10, where the workpiece may be intended to be routed to any of a plurality of networked workstations 20, which may be the same or different, or routed to multiple workstations sequentially. The networked database 30 may include the identity of the appropriate work order document 12 associated with a particular workpiece 10, as well as the specific manufacturing steps to be performed on each workpiece 10, among other information.

The systems and methods of the present disclosure may be particularly useful for manufacturing facilities that employ batch processing, or the execution of a series of manufacturing processes without manual intervention. In batch processing jobs may be set up so they can be run to completion without requiring operator interaction. For example, a given workstation may be given an input corresponding to a set of instructions for machining a given workpiece, and then carry out those instructions on each of a plurality of workpieces. Unfortunately, the introduction of an incorrect workpiece into a batch process may result in at least wasted time and materials, and possibly damage to the workstation itself.

The systems disclosed herein may provide an additional safeguard for batch processing systems by permitting an automated assessment of the suitability of a proposed batch. For example, the scanner 18 for a particular workstation 20 may interrogate multiple work order documents 12 and their respective identification tags 16 simultaneously, thereby obtaining their corresponding identifying codes 19. The identifying codes 19 may then be transmitted to the control system 26 for the workstation 20, which may then correlate the obtained identifying codes 19 with the one or more specific manufacturing steps associated with the work order documents 12. The control system 26 may then determine whether the specific manufacturing steps intended for each workpiece 10 correspond to a valid batch. That is, that the set of operations carried out by the control system 26 using the tooling 22 of workstation 20 is appropriate for each and every workpiece 10 having an associated work order document 12 disposed in the holding device 28.

Where the determination made by the control system 26 is that the specific manufacturing steps associated with the work order documents 12 do not correspond to a valid batch, the control system 26 may respond in one or more ways, for example by generating a notification for the input/output 32 that the proposed batch operation is not valid, and/or by identifying the one or more workpieces 10 associated with the multiple work order documents 12 that should not be included in the proposed batch operation.

The manufacturing systems of the present disclosure may include one or more additional components that are similarly tagged with an identification tag and/or scanning device. For example, a workstation, the workstation tooling, the means for transporting workpieces, and the like include scanning devices so that a control system 26 may notify an operator that a workpiece 10 has been delivered to the wrong workstation 20, that a given workpiece 10 has been separated from its associated work order document 12, or even that the improper tooling 22 has been associated with a given workstation 20.

While the systems and methods of the present disclosure may prove themselves advantageous in any of a variety of industries and disparate manufacturing processes, they may be particularly useful when applied to composite manufacturing. The use of automation and robotics in composite manufacturing may reduce variability in part dimensions, as well as minimizing manufacturing defects. In addition, feed material may be used more efficiently and labor costs may be reduced. Composite manufacturing systems may be envisaged that automate a combination of multiple discrete manufacturing processes, such as for example ply cutting, autoclaving, trimming, drilling, testing, and painting processes, among others.

The systems for carrying out the present automated or semi-automated methods, including but not limited to the control systems for selected workstations, may include suitable data processing systems, which may further include a communications framework to provide communications between workstations, control systems, processor units, memory, persistent storage, communications units, input/output (I/O) units, and displays.

Instructions for an appropriate operating system, applications, and/or programs may be located in one or more storage devices in communication with the one or more processor units through the communications framework. The instructions may be in a functional form on a persistent storage. These instructions may be loaded into a memory for execution by a processor unit.

These instructions may be referred to as program instructions, program code, computer usable program code, or computer readable program code that may be read and executed by a processor. The program code in the different embodiments may be embodied on different physical or computer-readable media.

Any combination of computer-readable media may be utilized. Computer-readable media can be a computer-readable signal medium and/or a computer-readable storage medium. A computer-readable storage medium may include an electronic, magnetic, optical, electromagnetic, infrared, and/or semiconductor system, apparatus, or device, or any suitable combination of these. More specific examples of a computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, and/or any suitable combination of these and/or the like. In the context of this disclosure, a computer-readable storage medium may include any suitable tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, and/or any suitable combination thereof. A computer-readable signal medium may include any computer-readable medium that is not a computer-readable storage medium and that is capable of communicating, propagating, or transporting a program for use by or in connection with an instruction execution system, apparatus, or device.

Program code embodied on a computer-readable medium may be transmitted using any appropriate medium, including but not limited to wireless, wireline, optical fiber cable, RF, and/or the like, and/or any suitable combination of these.

Computer program code for carrying out operations for aspects of the present disclosure may be written in one or any combination of programming languages, including an object-oriented programming language such as Java, Smalltalk, C++, and/or the like, and conventional procedural programming languages, such as the C programming language. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), and/or the connection may be made to an external computer (for example, through the Internet using an Internet Service Provider).

The computer program code or instructions can also be loaded onto a computer, other programmable data processing apparatus, and/or other device to cause a series of operational steps to be performed on the device to produce a computer-implemented process such that the instructions which execute on the computer or other programmable apparatus provide processes for implementing the functions/acts specified in the present disclosure, for example as embodied by flowcharts and/or block diagram block or blocks.

EXAMPLES, COMPONENTS, AND ALTERNATIVES

The following examples describe selected aspects of the systems and methods of the present disclosure. These examples are intended for illustration and should not be interpreted as limiting the entire scope of the present disclosure. Each example may include one or more distinct inventions, and/or contextual or related information, function, and/or structure.

Example 1

FIG. 6 illustrates a flowchart 40 of an illustrative method of processing a workpiece at a workstation. The method may include associating a workpiece with an identification tag including an identifying code, at 42 of flowchart 40. The identification tag of the work order document may be detected at a scanner, and the corresponding identifying code may be communicated to a control system, at 44 of flowchart 40. The control system may then generate an output to a workstation that includes an instruction for processing the workpiece, at 46 of flowchart 40.

Example 2

FIG. 7 illustrates a flowchart 50 of an illustrative method of batch processing workpieces in a composite manufacturing process. The method may include delivering multiple workpieces to a workstation, where each workpiece is associated with a work order document, at 52 of flowchart 50. Multiple associated work order documents may be delivered to a holding device associated with the workstation, at 54 of flowchart 50, where each work order document includes a tag that is configured to respond to interrogation by providing an identifying code correlated with a process to be performed on its associated workpiece, where the correlation is stored in a database that is accessible to the control system for the workstation. The method may further include interrogating the multiple tags, at 56 of flowchart 50, obtaining the identifying codes provided by the multiple tags, at 58 of flowchart 50, and transmitting the obtained identifying codes to the control system for the workstation, at 60 of flowchart 50. The method may further include correlating the obtained identifying codes with the processes to be performed on the workpieces by the particular workstation (designated by a workstation ID), at 62 of flowchart 50, and determining whether the processes to be performed on the workpieces correspond to a valid batch, at 64 of flowchart 50.

The method may further include the steps of identifying, based on the work order documents, instructions for the processes to be performed on the workpieces. For example, the method step 62 of correlating the obtained identifying codes with the processes to be performed on the workpieces may include the step of identifying, within a remote database, the processes to be performed that are specific to the particular workstation, and the step of retrieving the specific processes that are to be performed by the particular workstation on the workpiece. The retrieval step may include retrieving instructions or programs for causing a manufacturing apparatus to execute the processes. Upon identifying and retrieving the specific processes that are to be performed by the particular workstation on the workpiece, the method may further include the step of generating an output including instructions or programs for causing a manufacturing apparatus to execute the processes, associated with the work order documents and the particular workstation, that are to be performed on the multiple workpieces. For example, the control system may retrieve and output one or more programs for a numerically controlled manufacturing apparatus, for causing the apparatus to perform cutting operations corresponding to the work order documents and the particular workstation, to numerically control operation of a cutting tool to cut plies of a composite workpiece according to a defined perimeter geometry to fabricate a composite part.

Example 3

This section describes additional aspects and features of the systems and methods of the present disclosure, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A1. A manufacturing system, comprising:
a holding device configured to receive one or more work order documents, each work order document including an identification tag associated with that work order document, and each work order document corresponding with a specific manufacturing step;
a scanner proximate the holding device, the scanner being associated with a workstation, and being configured to detect the identification tag of the one or more work order documents held by the holding device; and
a control system configured to
interpret the detected identification tag;
identify the work order document associated with the interpreted identification tag;
identify the specific manufacturing step corresponding with the identified work order document; and
generate an output that includes an instruction for carrying out the specific manufacturing step at the workstation.

A2. The manufacturing system of paragraph A1, wherein the specific manufacturing step is further associated with a specific workpiece, and the instructions for carrying out the specific manufacturing step include instructions for processing the specific workpiece on the workstation.

A3. The manufacturing system of paragraph A2, wherein the one or more work order documents include a human-readable indicia identifying the associated specific workpiece and related processing information.

A4. The manufacturing system of paragraph A1, wherein the holding device includes a tray configured to support a plurality of work order documents.

A5. The manufacturing system of paragraph A1, wherein the holding device includes a clip member configured to clasp the one or more work order documents.

A6. The manufacturing system of paragraph A1, wherein the holding device includes a shelf or receptacle for receiving work order documents.

A7. The manufacturing system of paragraph A1, wherein the generated output includes an instruction to verify that the work order document and the associated specific workpiece are at the proper workstation.

A8. The manufacturing system of paragraph A1, wherein the generated output includes an instruction to verify that the work order document and associated workpiece are properly batched with one or more other work order documents and their associated workpieces for processing together at that workstation.

A9. The manufacturing system of paragraph A1, wherein the scanner is configured to detect multiple identification tags associated with multiple work order documents simultaneously.

A10. The manufacturing system of paragraph A9, wherein each identification tag includes an RFID chip, and the scanner is configured to detect and interpret the multiple RFID chips.

A11. The manufacturing system of paragraph A1, wherein each identification tag includes a barcode, and the scanner is configured to detect and interpret the barcode.

A12. The manufacturing system of paragraph A1, wherein the holding device and scanner are associated with a workstation utilized in manufacturing composite parts.

A13. The manufacturing system of paragraph A12, wherein the workstation is configured to carry out one or more of the composite manufacturing steps of ply cutting, layup, autoclaving, trimming, drilling, inspecting, and painting.

B1. A method of processing a workpiece, comprising
associating a workpiece with an identification tag including an identifying code;
detecting the identification tag at a scanner, and communicating the corresponding identifying code to a control system; and generating an output from the control system to a workstation that includes an instruction for processing the workpiece.

B2. The method of paragraph B1, wherein the identification tag is coupled to the workpiece.

B3. The method of paragraph B1, wherein the identification tag is coupled to a word order document that is itself associated with the workpiece.

B4. The method of paragraph B3, further comprising delivering the work order document to a holding device associated with the workstation; and detecting the identification tag includes detecting the identification tag at the holding device.

B5. The method of paragraph B1, wherein detecting the identification tag includes detecting multiple identification tags simultaneously.

B6. The method of paragraph B1, wherein the generating step includes generating an output that includes one or more of a confirmation that the workpiece is at the proper workstation, a notice that the workpiece is not at the proper workstation, a confirmation that the workpiece is properly batched with one or more additional workpieces, and a notice that the workpiece is not properly batched with one or more additional workpieces.

B7. The method of paragraph B1, wherein the detecting step includes detecting an RFID chip associated with the identification tag.

C1. A method of batch processing workpieces in a composite manufacturing process, comprising:

delivering a plurality of workpieces to a workstation, each workpiece being associated with a work order document;

delivering the plurality of associated work order documents to a holding device that is associated with the workstation; wherein each work order document includes a tag that is configured to respond to interrogation by providing an identifying code that is correlated with a process to be performed on the workpiece associated with that work order document at the workstation, the correlation being stored in a database that is accessible to a control system for the workstation;

interrogating the plurality of tags;

obtaining the identifying codes provided by the plurality of tags;

transmitting the obtained identifying codes to the control system for the workstation;

correlating, by the control system, the plurality of obtained identifying codes with the plurality of processes to be performed on the plurality of workpieces; and determining, by the control system, whether the plurality of processes to be performed on the plurality of workpieces corresponds to a valid batch.

C2. The method of paragraph C1, further comprising generating an output by the control system to the workstation that includes the control system's determination of whether the plurality of processes to be performed on the plurality of workpieces delivered to the workstation correspond to a valid batch for a batch operation at the workstation.

C3. The method of paragraph C2, wherein generating an output by the control system to the workstation includes generating a determination that the plurality of processes do not correspond to a valid batch for the batch operation.

C4. The method of paragraph C2, wherein generating an output by the control system includes generating an identification of the one or more workpieces that should not be included in the batch operation.

C5. The method of paragraph C1, wherein each tag includes an RFID chip, and interrogating the plurality of tags includes interrogating the RFID chips using an RFID reader.

C6. The method of paragraph C1, wherein delivering the plurality of associated work order documents to the holding device includes placing the plurality of associated work order documents in a holding tray associated with the workstation.

C7. The method of paragraph C1, wherein determining whether the plurality of processes to be performed corresponds to a valid batch includes determining whether a plurality of composite materials manufacturing processes correspond to a valid batch.

C8. The method of paragraph C7, wherein determining whether the plurality of processes to be performed corresponds to a valid batch includes determining whether a plurality of manufacturing processes selected from ply cutting, autoclaving, trimming, drilling, testing, and painting processes correspond to a valid batch for a batch operation at the workstation.

Advantages, Features, Benefits

The presently disclosed systems and methods include the association of an identifying tag with a work order document for example when the work order is first initiated. The work order document may be associated with a particular job process. Advantageously, throughout the subsequent manufacturing process, the system of intelligent sensing in combination with the identifying tag may ensure that only the correct materials, tools, and machine programs are used in a defined manufacturing step. The work order document may further be correlated with any necessary data from a relevant engineering model, and/or process specification, and this correlation may occur in real time, further enhancing the effectiveness of and high reliability of the present systems. Further, the progress of a given work order through a production sequence may be monitored as it moves from workstation to workstation. For at least these reasons, the present systems and methods may greatly reduce the risk of a work order getting separated from its corresponding workpiece in a production sequence, or a given workpiece being subjected to an incorrect procedure.

CONCLUSION

The disclosure set forth above may encompass multiple distinct inventions with independent utility. Although each of these inventions has been disclosed in its preferred form(s), the specific examples thereof as disclosed and illustrated herein are not to be considered in a limiting sense, because numerous variations are possible. The subject matter of the inventions includes all novel and nonobvious combinations and subcombinations of the various elements, features, functions, and/or properties disclosed herein. The following claims particularly point out certain combinations and subcombinations regarded as novel and nonobvious. Inventions embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the present disclosure.

What is claimed is:

1. A manufacturing system, comprising:
a holding device configured to receive one or more work order documents, each work order document including an identification tag associated with that work order document, and each work order document corresponding with a specific manufacturing step;
a scanner proximate the holding device, the scanner being associated with a workstation;
wherein when the holding device receives each work order document such that the identification tag associated with that work order document is positioned for interrogation by the scanner, the scanner being configured to detect the identification tag of the one or more work order documents held by the holding device; and
a control system configured to
interpret the detected identification tag;
identify the work order document associated with the interpreted identification tag;
identify the specific manufacturing step corresponding with the identified work order document; and
generate an output that includes an instruction for carrying out the specific manufacturing step at the workstation.

2. The manufacturing system of claim 1, wherein the specific manufacturing step is further associated with a specific workpiece, and the instructions for carrying out the specific manufacturing step include instructions for processing the specific workpiece on the workstation.

3. The manufacturing system of claim 2, wherein the one or more work order documents include a human-readable indicia identifying the associated specific workpiece and related processing information.

4. The manufacturing system of claim 1, wherein the holding device includes a tray configured to support a plurality of work order documents, a clip member configured to clasp the one or more work order documents, or a shelf or receptacle for receiving work order documents.

5. The manufacturing system of claim 2, wherein the generated output includes an instruction to verify that the work order document and the associated specific workpiece are at the proper workstation.

6. The manufacturing system of claim 2, wherein the generated output includes an instruction to verify that the work order document and associated workpiece are properly batched with one or more other work order documents and their associated workpieces for processing together at that workstation.

7. The manufacturing system of claim 1, wherein the scanner is configured to detect multiple identification tags associated with multiple work order documents simultaneously.

8. The manufacturing system of claim 7, wherein each identification tag includes an RFID chip, and the scanner is configured to detect and interpret the multiple RFID chips.

9. The manufacturing system of claim 1, wherein each identification tag includes a barcode, and the scanner is configured to detect and interpret the barcode.

10. The manufacturing system of claim 1, wherein the holding device and scanner are associated with a workstation utilized in manufacturing composite parts.

11. The manufacturing system of claim 10, wherein the workstation is configured to carry out one or more of the composite manufacturing steps of ply cutting, layup, autoclaving, trimming, drilling, inspecting, and painting.

12. A method of processing a workpiece, comprising
associating a workpiece with a work order document that includes an identification tag configured to provide an identifying code;
placing the work order document in a holding device positioned for interrogation by a scanner;
detecting the identification tag by the scanner, and communicating the corresponding identifying code to a control system; and
generating an output from the control system to a workstation that includes an instruction for processing the workpiece.

13. The method of claim 12, wherein the identification tag is coupled to the workpiece.

14. The method of claim 12, wherein the identification tag is coupled to the work order document that is associated with the workpiece.

15. The method of claim 14, further comprising delivering the work order document to a holding device associated with the workstation;
wherein detecting the identification tag includes detecting the identification tag at the holding device.

16. The method of claim 12, wherein detecting the identification tag includes detecting multiple identification tags simultaneously.

17. The method of claim 12, wherein the generating step includes generating an output that includes one or more of a confirmation that the workpiece is at the proper workstation, a notice that the workpiece is not at the proper workstation, a confirmation that the workpiece is properly batched with one or more additional workpieces, and a notice that the workpiece is not properly batched with one or more additional workpieces.

18. A method of batch processing workpieces in a composite manufacturing process, comprising:
delivering a plurality of workpieces to a workstation, each workpiece being associated with a work order document;
delivering the plurality of associated work order documents to a holding device that is associated with the workstation; wherein
each work order document includes a tag that is configured to respond to interrogation by providing an identifying code that is correlated with a process to be performed on the workpiece associated with that work order document at the workstation, the correlation being stored in a database that is accessible to a control system for the workstation;
interrogating the plurality of tags;
obtaining the identifying codes provided by the plurality of tags;
transmitting the obtained identifying codes to the control system for the workstation;
correlating, by the control system, the plurality of obtained identifying codes with the plurality of processes to be performed on the plurality of workpieces; and
determining, by the control system, whether the plurality of processes to be performed on the plurality of workpieces corresponds to a valid batch.

19. The method of claim 18, further comprising generating an output by the control system to the workstation that includes the control system's determination of whether the plurality of processes to be performed on the plurality of workpieces delivered to the workstation correspond to a valid batch for a batch operation at the workstation.

20. The method of claim 18, wherein each tag includes an RFID chip, and interrogating the plurality of tags includes interrogating the RFID chips using an RFID reader; and
    wherein determining whether the plurality of processes to be performed corresponds to a valid batch includes determining whether the plurality of processes to be performed corresponds to one of composite material ply cutting, autoclaving, trimming, drilling, testing, and painting processes.

\* \* \* \* \*